Figure 1:
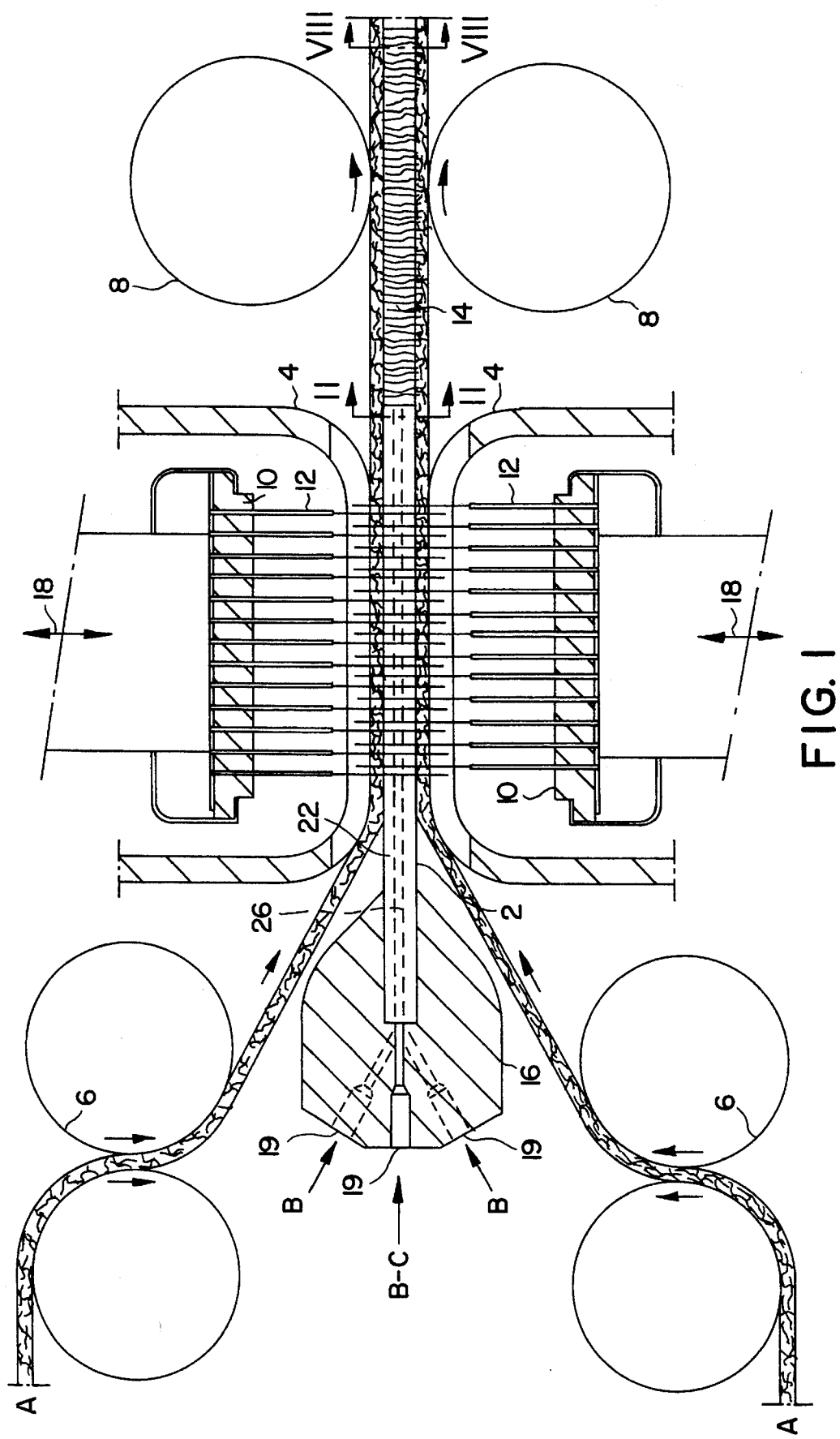

United States Patent [19]

Le Roy

[11] Patent Number: 5,475,904
[45] Date of Patent: Dec. 19, 1995

[54] METHOD AND DEVICE FOR PRODUCING COMPOSITE LAPS AND COMPOSITES THEREBY OBTAINED

[76] Inventor: Guy Le Roy, 33 rue Bastien Lepage, F-91140 Villebon Sur Yvette, France

[21] Appl. No.: 175,413

[22] PCT Filed: Jul. 1, 1992

[86] PCT No.: PCT/FR92/00612

§ 371 Date: Dec. 30, 1993

§ 102(e) Date: Dec. 30, 1993

[87] PCT Pub. No.: WO93/01340

PCT Pub. Date: Jan. 21, 1993

[30] Foreign Application Priority Data

Jul. 3, 1991 [FR] France .................... 91 08279

[51] Int. Cl.$^6$ .................................................. D04H 18/00
[52] U.S. Cl. ........................... 28/108; 112/420; 156/148
[58] Field of Search ............................ 28/108, 109, 111, 28/117, 121, 158; 156/148, 139; 112/262, 417, 418, 422

[56] References Cited

U.S. PATENT DOCUMENTS

| | | | |
|---|---|---|---|
| 1,508,895 | 9/1924 | Paltzer | 112/139 |
| 1,764,846 | 6/1930 | Maier | 112/139 |
| 1,903,424 | 4/1933 | Gordon et al. | 112/420 X |
| 2,074,663 | 3/1937 | Mitchell | 112/420 |
| 3,150,621 | 9/1964 | Warnock | 112/139 X |
| 3,154,462 | 10/1964 | Smith, II | 28/108 X |
| 3,354,020 | 11/1967 | Copeland | 28/109 X |
| 4,070,217 | 1/1978 | Smith, II et al. | 156/148 X |
| 4,498,941 | 2/1985 | Goldsworthy | 156/148 |

Primary Examiner—John J. Calvert
Attorney, Agent, or Firm—Bierman and Muserlian

[57] ABSTRACT

Two laps are needled together between longitudinal guide tubes which maintain spacing between the laps and downstream of the needling position, the tubes release an interleaving material between the laps and between the rows of bridges formed by needling, the interleaving material consisting of resin, powder, fibers, tubes, wires, threads, and/or electrical conductors.

26 Claims, 5 Drawing Sheets

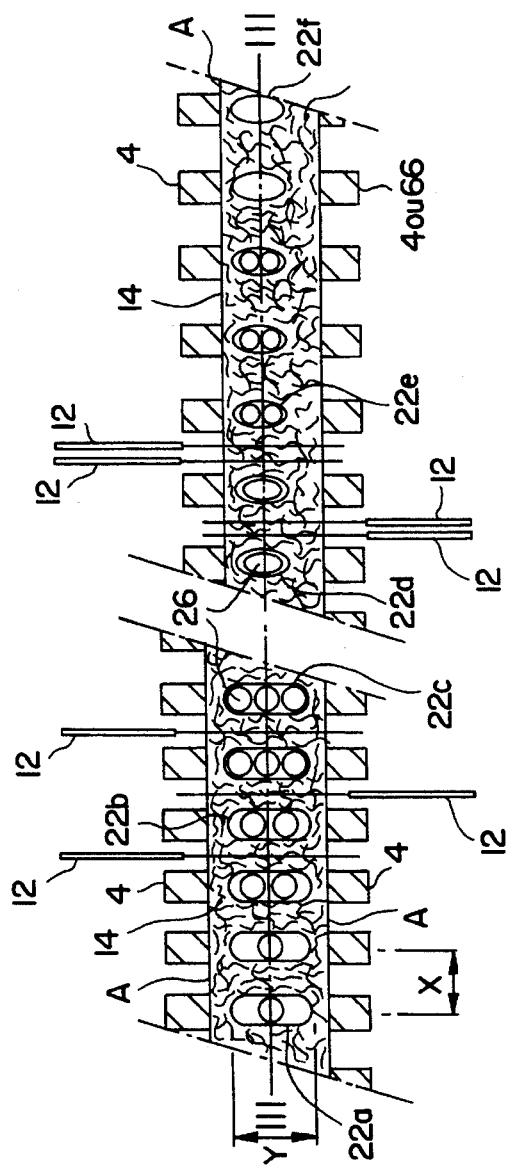
FIG. 2
FIG. 3
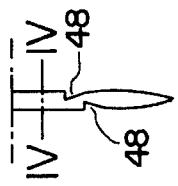
FIG. 4
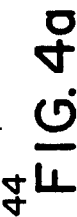
FIG. 4a
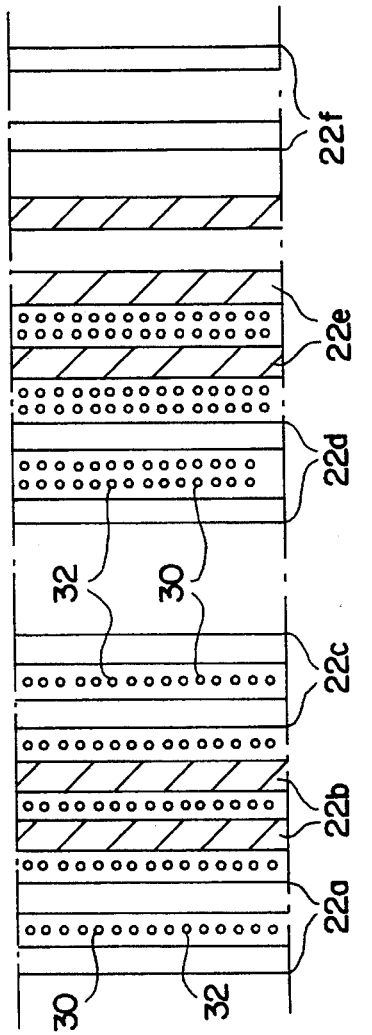
FIG. 5

METHOD AND DEVICE FOR PRODUCING COMPOSITE LAPS AND COMPOSITES THEREBY OBTAINED

This invention relates to a method and device for producing composite laps.

In accordance with EP-A-0086996 the aim is to manufacture a composite product which has some mechanical strength while retaining the ability to be formed. In order to achieve this a pasty mass which is soaked with water is placed between two laps, and the two laps are needled through the pasty mass. The two laps are kept apart at all times by a distance which is maintained without accuracy by the pasty mass, which of course has a very variable thickness. This spacing varies during needling. The upper lap which is subjected to needling is considerably deformed by passage of the needles because the pasty mass does not provide it which adequate support.

The thickness of the product obtained is uncertain. Needling through the interleaved constituent makes work difficult for the needles and needling may be impossible with some kinds of interleaved constituent, which would either not permit the needles to pass through or would be damaged by such passage.

DE 2356511 describes a method for assembling together, by means of bridges of needled fibres, two basic laps which are separate from each other with the intention that the laps should then be separated by cutting the fibre bridges in order to yield two identical velvet laps.

The DE-A-2 348 600 discloses a method for manufacturing i.a. heating blankets, wherein a heating wire is introduced during a later step between two assembled basic laps. This method needs the time for introducing the wire in addition to the time for needling. The introduction step which is only mentioned rather than described, appears to be a difficult step.

The purpose of the invention is to allow the simultaneous and continuous assembly of very varied components in order to obtain composite laps whose properties may be very varied depending on their applications.

In accordance with a first aspect of the invention the method for producing a composite lap in which two basic laps are joined together along longitudinal join lines while keeping them, where the joining process occurs, separated from each other by mechanical action between the join lines in the process of formation is characterised in that, as both laps are being joined, an interleaved constituent is guided between the laps thereby to introduce it into the longitudinal spaces which are formed between the longitudinal join lines by said mechanical action.

By keeping the laps separate from each other by mechanical means a perfectly gauged product is obtained. The needles only have to pass through the two laps, without wearing or breaking in the interleaved constituent, and without damaging the latter. The interleaved constituent is simultaneously introduced into the longitudinal spaces created by the mechanical action between the longitudinal join lines which have already been constructed. In this way the interleaved constituent easily finds its place, takes a correct position and does not need to be introduced later, which later step would be time consuming All in all the invention makes it possible to obtain rapidly a much greater variety of much better gauged products with less wear on the equipment.

In a particular version in which the basic laps are fed from either side of a table with longitudinal ribs, and the basic laps are joined together in such a way that the longitudinal join lines extend between the ribs, it is provided that the interleaved constituent is introduced through longitudinal ducts constructed within the ribs in such a way that the interleaved constituent is located between the basic laps and between the longitudinal join lines as it leaves the ribs. At least one fluid or one powder which bonds to at least one of the basic laps on leaving the ducts can be injected into the ducts in the ribs. This fluid component may be a thermosetting or thermoforming resin, a plaster, a cement, an elastomer or a foam. The interleaved member may also be selected to be a solid member such as cables, electrical conductors, tubes, bundles of filaments and wires and threads of all kinds.

The two basic laps can be joined together by needling, stitching or welding, e.g. laser or ultrasonic welding.

The two basic laps may be fibrous (fibres or yarns) laps which have been woven or preconsolidated by mechanical or thermal or chemical means or by any other method of consolidation. The basic laps may consist of the same material or materials of different origin and structure and of different weights and densities. The basic laps may comprise synthetic, artificial, animal, plant or inorganic fibres, either as mixtures or pure, including carbon fibres or metal fibres.

Each basic lap may be associated with a woven fabric or any other support which improves transport within the device, or which is useful for construction of the final composite lap.

The interleaved constituent introduced in the form of a fluid is injected so that it is finally converted after possible supplementary processing outside the device in order to obtain an interleaved constituent having specific properties such as insulating, absorbent, mechanical consolidation or thermal or chemical resistance properties and any property which may be obtained from a component which is initially injectable.

Complementarily, or alternatively, the interleaved constituent may incorporate threads or filaments of various origins such as metal or plastic threads, or carbon, synthetic, artificial, animal and plant threads or filaments or multi-components threads or filaments. These threads or filaments will have a cross-section, gauge and weight which varies according to need. For example, the interleaved constituent may consist of synthetic filaments with a low melting point, which can therefore melt, with the result that they can therefore be dispersed within their environment in the course of a thermal processing in order to consolidate the components surrounding them.

This interleaved constituent may also be e.g. a hollow or solid sheath, an insulated electrical cable, a section of special material (porous, absorbent, etc., material) which imparts specific properties to the composite lap obtained.

In accordance with a second aspect of the invention the device for manufacturing a composite lap which comprises means for guiding two basic laps parallel to each other with mechanical means to set a spacing between them and means for connecting the two laps along longitudinal join lines in the vicinity of said mechanical means is characterised in that it also comprises means for guiding an interleaved constituent between the laps while saids laps are advanced parallel to each other, in order to introduce said constituent into the longitudinal spaces defined by the mechanical means between the longitudinal join lines.

Other features and advantages of the invention will be apparent from the description below which relates to non-restrictive examples.

Figure 6:
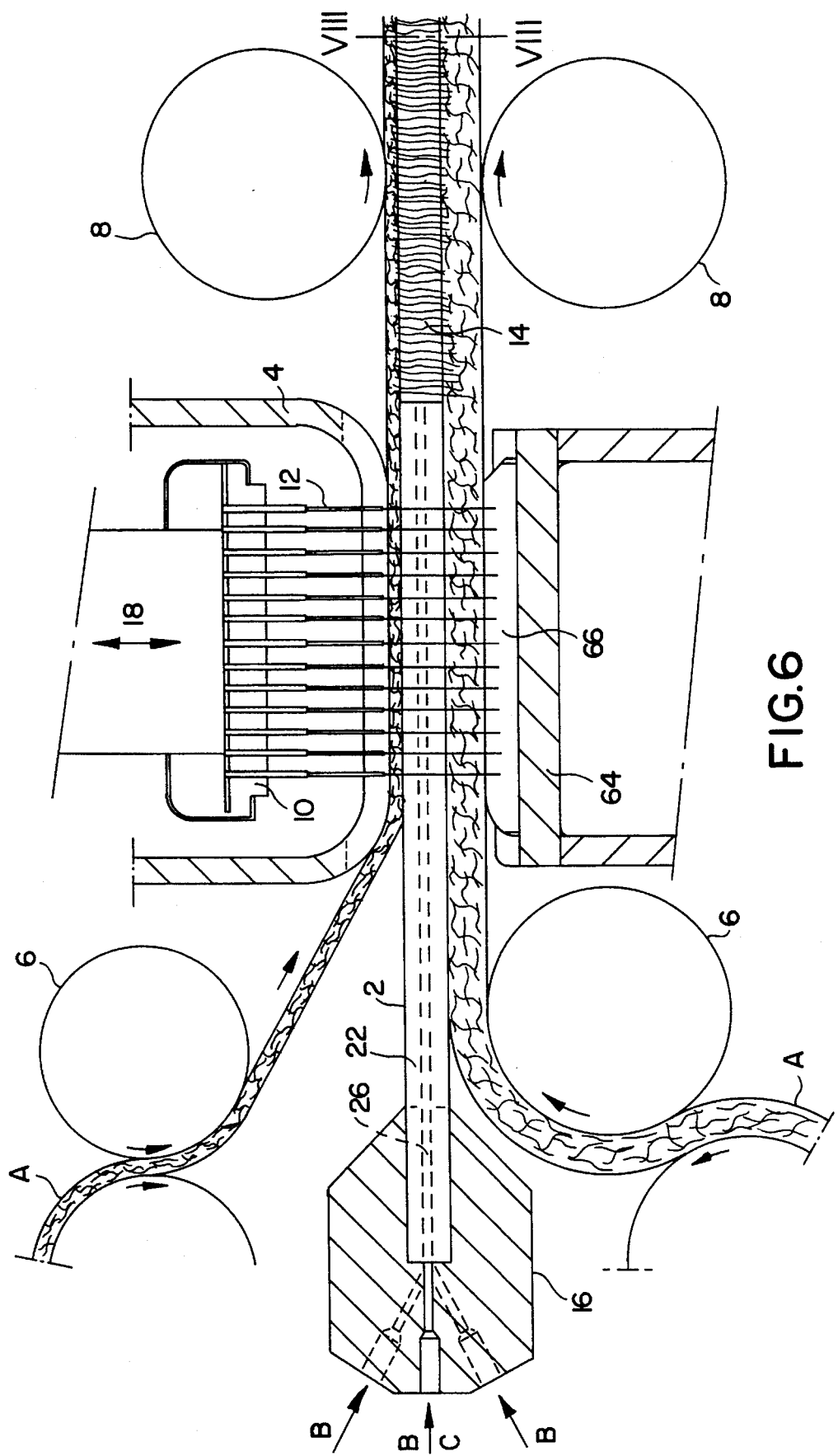
Figure 7:
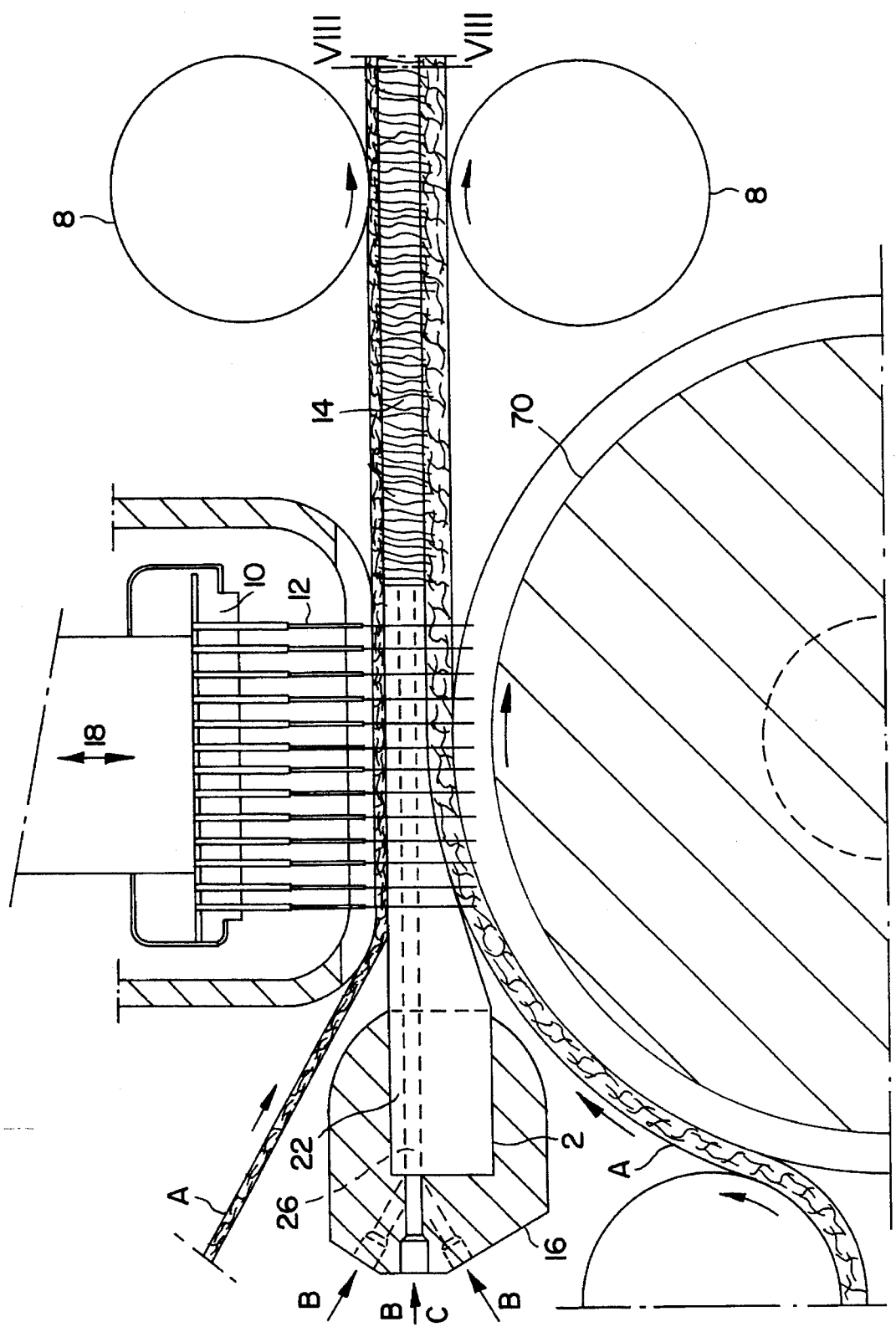

In the appended drawings:

FIG. 1 is a view in vertical longitudinal cross-section of a device according to the invention, FIG. 2 is a partial view in cross-section along line II—II in FIG. 1, illustrating various exemplary embodiments, FIG. 3 is a partial view along plane III—III in FIG. 2, FIG. 4 is a view of a felting needle with a detail of its end on a magnified scale, FIG. 4a is a view of two variants of transverse cross-sections through the needle, FIG. 5 is similar to FIG. 4, but relates to another needle, and also provides an end view, FIGS. 6 and 7 are views similar to FIG. 1, but relate to two other embodiments of the device, and, FIGS. 8 to 13 are partial transverse cross-sections through composite laps according to the invention along plane VIII—VIII in FIG. 1.

The device illustrated in FIG. 1 uses the needling technology which is in itself known for the manufacture of non-woven products. The principle of the needling of fibre laps causes linking between the fibres and thus consolidation of the lap using needles (12) which draw the fibres in a vertical or oblique direction with respect to the horizontal surface of the lap, in which the fibres may have a preorientated or random orientation. This vertical or oblique back and forth motion of the needles at high speed interlinks the fibres an consolidates the lap needled in this way.

Needles (12), FIG. 1, are mounted on needle boards (10) which keep them in position in accordance with a selected arrangement. The needle boards (10), which are driven by eccentrics (not shown), perform a back and forth movement (18).

In accordance with the invention, as shown in FIG. 1, two basic laps (A) are fed into the device in such a way that they take up a position in which they are horizontal and parallel to each other and are separated by a table (2) with longitudinal ribs which governs the spacing between the two laps (A).

The ribbed table (2) may have a thickness which decreases from the inlet towards the outlet of the device in order to encourage the basic laps to slide towards the outlet.

The basic laps (A) are each held in position by two rolled plates (4) called "strippers", which can be adjusted so as to adjust the spacing with respect to the ribbed table (2). The laps (A) advance at the same speed within the device, through the rotation of feed rollers (6) and delivery rollers (8).

The two laps are joined together mechanically by means of the simultaneous reciprocal back and forth movement (18) of needle boards (10) in such a way that opposing needles (12) simultaneously penetrate the basic laps which are to be linked. The needles are felting needles (12) with barbs, which are also illustrated in FIGS. 4 and 4a, or velvet needles as illustrated in FIG. 5.

In order to permit simultaneous penetration without the needles striking each other the needles on each board are offset with respect to those on the other board.

These needles are arranged in such a way that they penetrate basic laps (A) in the longitudinal spaces between the longitudinal ribs (22) of table (2) producing longitudinal join lines (14) between the two basic laps (A). The fibres of the longitudinal join lines created in this way originate in each basic lap (A) and become implanted in the opposite lap.

The offset arrangement of the needles in one board with respect to those in the other board causes an alternation of the fibres originating from each of the laps (A) in the longitudinal join lines.

Needle boards (10) can be adjusted for penetration depth so as to ensure accurate location of the fibres of the longitudinal joint lines in the opposite lap. The specifications for the ribs (22) and their spacing are defined for each type of composite lap.

Rib-bearing mount (16) is designed to be interchangeable according to the type of ribs (22) used, to preset the spacing between the ribs and to make it possible for them to be replaced.

Depending on the space set between the ribs (22), one or more rows of felting needles (12) may be used in each of the spaces between the ribs (22) (see FIGS. 2 and 3, right hand part, where the ribs are indicated by (22d) to (22f)). The number of ribs (22) and of spacings between the ribs are determined on the basis of the width of the desired composite lap.

This working width is only limited by the technical possibilities for manufacture of the device. Widths up to 4 metres can easily be envisaged.

Basic laps (A) can be drawn in by continuous or discontinuous advance of rollers (6) and (8), with the form of advance used for delivery rollers in needle felting machines.

Discontinuous advance of the basic laps (A) has the advantage of stopping the forward movement of the laps when the felting needles (12) penetrate them. Laps (A) therefore advance when the felting needles are not within them.

The feed pitch represents the amount by which the laps advance for one revolution of the eccentrics providing the back and forth motion (18). The feed pitch is synchronised with the movement of the eccentric driving the needle boards (10) in their back and forth movement (18). This pitch is a parameter which is defined on the basis of the desired density of the fibres forming the longitudinal join lines, the volume of the interleaved constituent fluid which is to be injected, and the rate at which the needle boards (10) strike. During needling the speed of the delivery rollers is generally between 0.50 and 10 m/min.

FIG. 2 shows the longitudinal join lines (14), which consist of fibres, between ribs (22), designated by (22a) to (22f) to identify various different examples of ribs (22).

Strippers (4) hold basic laps (A) when felting needles (12) are withdrawn in the course of their back and forth motion (18).

Dimension X is the specified pitch between ribs (22). This dimension may be a regular or an irregular spacing. Dimension X may reasonably vary from 3 mm up to a dimension which has to be determined according to the needs for the composite lap.

It should be noted that this dimension X also defines the setting-out pitch for the needle rows (12) on needle boards (10).

Dimension Y corresponds to the depth of ribs (22). Maximum dimension Y depends on the length of the felting needles (12) available, which currently have a maximum length of 102 mm, and the travel of the eccentric used for the back and forth motion (18) of needle boards (10), and the thicknesses of the basic laps (A) fed into the device.

In accordance with the invention, ribs (22) are designed with at least one longitudinal duct (26) through which a fluid (B) and/or solid (C) interleaved constituent may pass (FIG. 1).

The upstream ends of these ducts relative to the direction of movement of basic laps (A) are attached to feed nozzles (19) constructed within rib mounting (16), and their downstream ends, located downstream from needles (12), open into the space between the two basic laps (A) and between the longitudinal join lines (14).

The feed nozzles (19) cans be used to introduce one or more interleaved constituents into the ducts (26), upstream of the ribbed table (2) so that these constituents are inserted into the basic laps (A) downstream from ribbed table (2).

In other applications there are several conduits (26) in each rib (22) (ribs 22b, c and a), connected to different nozzles (19), through which at least two different interleaved constituents can be introduced into each duct in a rib (22) opening between two adjacent rows of longitudinal join lines (14). The two interleaved constituents may be products which are designed to set when they mix downstream of ribbed table (22).

The cross-sectional shapes of ribs (22) and their duct(s) (26) are determined and designed in relation to the composite lap being manufactured. FIG. 2 shows different rib cross-sections (which are not restricted to the example) specified for different applications.

FIG. 3 is a partial view along the plane III—III in FIG. 2.

It shows the points of impact of needles (12) located between ribs (22) on basic laps (A) to provide the longitudinal join lines (14) between laps (A).

Impacts (30) originate from the upper needle board (10) in FIG. 1, and impacts (32) originate from the lower needle board (10) in the same figure.

In the example shown, on the left hand side of FIGS. 2 and 3 there is a single row of needle impacts between two ribs (22), and on the right hand side there are two rows of impacts between ribs (22). More rows of needles can be provided between adjacent ribs, where the space between two adjacent ribs (22) permits it. The orientation of the rows of impacts is in the direction of movement of basic laps (A).

Rib (22a) incorporates a wide duct (26) for the introduction of interleaved threads or filaments or a fluid interleaved constituent.

In rib (22b) two ducts are used to introduce two different or identical interleaved constituents (B).

Rib (22c) incorporates three ducts which are used to introduce a solid interleaved constituent (C) and two fluid interleaved constituents (B), or three fluid interleaved constituents (B).

The shapes of the ribs are determined on the basis of the interleaved components which have to be introduced, and the structure, thickness and intrinsic qualities of the composite lap which is to be manufactured.

FIG. 4 shows a felting needle like those used in conventional needling. The needle used in the device may be of standard manufacture, or, for specific applications, may be designed and adapted for the composite lap which is to be manufactured, on the basis of the composition of the basic laps (A).

The working portion (40) is equipped with barbs (48) which draw fibres from the basic laps (A) between ribs (22) into the opposite laps.

These barbs are located along the ridges of the needle as shown in the magnified triangular cross—section IV—IV in FIG. 4a. This cross-section may be cruciform, round or of another shape. The barbs are located on the ridges (44), and face upstream and downstream with respect to the direction of movement (46) of the basic laps, thus also making it possible to protect the sides of ribs (22) by using ridges without barbs (47). In the case of round or oval cross-sections (not shown) the barbs are located in the same way, if necessary, and for the same purpose. These needles may also be of such length and gauge and carry barbs as necessary.

The barbs are located on the ridges at intervals appropriate to the requirements for the needling of the basic laps. They may be arranged in one location or may be spaced along the ridges (44).

FIG. 5 illustrates a different needle (12) as used in conventional needling for velvet. The working portion (50) is at the end of the needle. This works in the same manner as the needle in FIG. 4, and will be selected on the basis of the composite lap being manufactured.

The magnified end of the needle shows a groove (52) for drawing fibres. The axis (54) of this groove can be positioned with respect to the tang on the needle (56) as necessary.

FIG. 6 is a view similar to that in FIG. 1 showing a variant embodiment of the device in FIG. 1.

This device works with a single needle board (10) to insert fibres from the upper basic lap into the lower basic lap. Ribbed table (2) here has the same functions as that in FIG. 1. An opposing table (64) equipped with ribs (66) which have the same pitch X as the ribs in Table (2) to permit needles (12) to pass within the same gaps between the ribs supports lower basic lap (A). Countertable (64) can be adjusted for height to permit laps of different thickness to pass.

In this process the fibres in the longitudinal join lines (14) originate solely from the upper basic lap.

This arrangement can be used to assemble very different basic laps, where the lower lap has a composition which does not permit use of the device according to FIG. 1.

The example in FIG. 7 will only be described in relation to its differences with respect to that in FIG. 6. Countertable (64) is replaced by a rotary countertable comprising a ribbed roller (70).

The peripheral ribs of the roller have the same pitch X as ribbed table (2), so as to permit the needles to pass into the spaces between the ribs.

This arrangement makes it easier to feed the lower basic laps (A), which may e.g. be more fragile, such as ceramic fibre laps.

Figures 8, 9:
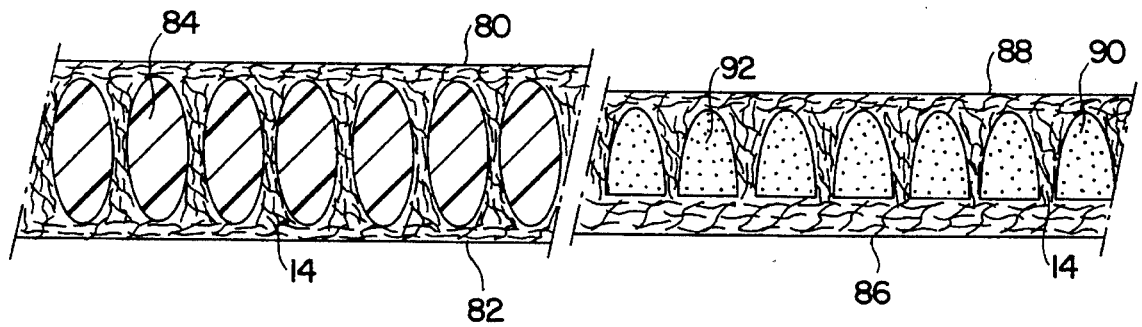

The following figures show transverse cross-sections of composite laps constructed in accordance with the process described along the plane VIII—VIII in FIGS. 1, 7 and 8.

FIG. 8 shows a composite lap comprising e.g. a first basic lap based on lapped preconsolidated aramide fibres (80). The other basic lap may then be based on lapped preconsolidated carbon fibres (82).

The interleaved constituent (84) providing the filling between the longitudinal join lines (14) and laps (80) and (82) is e.g. a thermoplastic resin which provides mechanical consolidation for the entire composite lap, and, if necessary, allows it to undergo thermoforming. One of the two basic laps may also be a glass fibre lap. The composite lap in FIG. 8 may be constructed using e.g. a device according to FIG. 1.

FIG. 9 illustrates a composite lap comprising e.g. a first basic lap of the wallcovering or needled mat (86) type having a surface finish on its outer side.

The other basic lap consists of lapped preconsolidated polypropylene fibres (88). The longitudinal join lines consist of fibres picked up from this lap (88) in order to be implanted in the wallcovering or mat (86). The interleaved component (90) is an insulating foam, or a plaster, or an elastomer foam, which is injected as fluid before final treatment. These composite laps constructed in this way are intended for use as insulating panels (with foam or plaster) or floor mats (with elastomer) for work involving repeated compression, such as sports mats. Another interleaved constituent (92), e.g. an electrical heating resistance, may be added to constituent (90) in the case of panels for insulating partitions. Manufacture will then take place in a device according to FIGS. 6 or 7, with a needle board (10) on the side of lap (88).

Figures 10, 11:
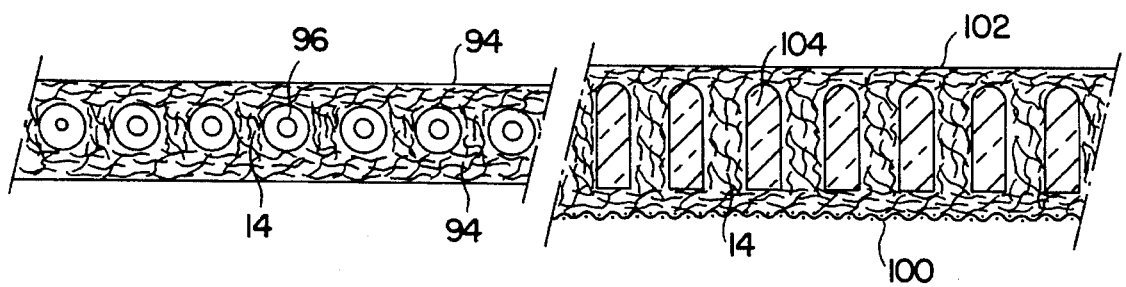

FIG. 10 shows a composite lap consisting of two basic laps (94) consisting of mixed fibres, where one is a fibre which can be melted through the action of heat at low temperature. This thermofusing fibre is associated with fibres forming the support for the basic laps, thus the basis of the composite lap, in a proportion of between 10 and 30%. These laps (94) are preconsolidated and then assembled in the device through the longitudinal join lines.

The interleaved constituent (96) may be a sheathed electrical cable, fed from the mount (16) in FIG. 1. In this case the ribs guide cables (96). The latter may also act as ribs if they are positioned by mounting (16).

After heat treatment the assembly forms a rigid panel. Manufacture is carried out in a device according to FIG. 1. This example provides an opportunity to demonstrate the possibility of introducing solid interleaved constituents for incorporation in composite laps.

In some circumstances this solid constituent might replace the ribs in their function, where this is possible as a result of its compatible shape for use in the device according to FIGS. 1, 6 and 7.

FIG. 11 illustrates a composite lap consisting of a basic lap (100) which has a surface finish in the form of a fabric which has previously been bonded to a non-woven preconsolidated lap on the side facing the other lap.

The other basic lap (102) is a preconsolidated non-woven material from which needles (12) in needleboard (10) pick up fibres from lap (102) to implant them into lower basic lap (100) and thus form the longitudinal join lines. The basic constituent (104) fills the spaces available on leaving the ribs, between the longitudinal join lines and laps (100) and (102) to form a composite lap of the wall panel type, or, if the fabric is a glass fibre fabric, a panel for shipbuilding and similar purposes. A device used in this case is as shown in FIGS. 6 or 7.

Figures 12, 13:
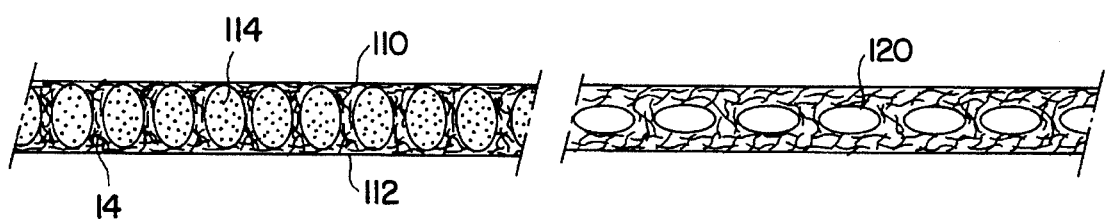

FIG. 12 shows a composite lap consisting of a basic lap (110) comprising a preconsolidated non-woven polyester material weighing 80 to 150 g/m$^2$. The other basic lap (112) consists of a preconsolidated non-woven viscose material weighing 150 to 230 g/m$^2$.

These two laps are joined together by longitudinal join lines consisting of their respective fibres. The interleaved constituent (114) is a multi-filament polymer which is superabsorbent on contact with a liquid. This composite lap is designed for medical or health applications. The composite is manufactured using the device in FIG. 1. On this principle other composite laps may be manufactured for industrial applications which require the absorption of a liquid product.

FIG. 13 represents a composite geotextile lap for drainage or similar applications. This may be a filtering panel for liquid, the liquid being drained by the capillary tube (120), which is here shown to be oval but may have any cross-section compatible with the device. The basic laps forming the composite lap are determined on the basis of the intended applications.

Of course the invention is not restricted to the examples of devices and composite laps deriving from the process as described and illustrated.

I claim:

1. A device for manufacturing a composite lap, comprising means (2), (4) for advancing and guiding two basic laps (A) parallel to each other, mechanical means (22) for determining a space between said laps, means (10), (12), (18) for joining the two laps together along longitudinal join lines (14) at a position where said mechanical means are effective for mechanically spacing said laps apart from each other, and means (19), (26) for guiding an interleaved material (B), (C) between the two laps while said laps are advanced parallel to each other, to introduce said interleaved material into the longitudinal spaces defined by the mechanical means between the longitudinal join lines (14).

2. A device of claim 1, wherein the means for joining the two basic laps (A) together are needling means (18).

3. A device of claim 1 wherein the means for joining the two basic laps (A) are stitching means.

4. A device of claim 1 wherein the means for joining the two basic laps (A) are laser or ultrasonic welding means.

5. A device of claim 1 wherein the means for introducing an interleaved material (B), (C) comprise ducts (26) which are open at their downstream ends and which extend between the join lines (14).

6. A device of claim 5, wherein the ducts (26) are located within the mechanical means (22) for determining a space.

7. A device according to claim 5, wherein said downstream ends of the ducts (26) are located downstream of said means for joining the two laps, relatively to a direction in which said basic laps are advanced by said means for advancing and guiding two basic laps.

8. A device according to claim 1, wherein said mechanical means are a plurality of laterally spaced mechanical means and said means for joining the two laps are operable between said laterally spaced mechanical means.

9. A device according to claim 8, comprising longitudinal elements extending between said means for joining the two laps and having an outer face defining said laterally spaced mechanical means for determining a space between said laps, and an inner face belonging to said means for guiding an interleaved material.

10. A method for producing a composite lap comprising
  driving and guiding two basic laps (A) in a substantially parallel relationship through a joining position and through a subsequent interleaving position;
  joining said two basic laps (A) to each other at the joining position along longitudinal join lines (14) while maintaining, at said joining position, a predetermined distance between said laps by means of a mechanical action between the join lines which are being created to produce between the laps, as said join lines, rows of join bridges with each join bridge having a preset length;
  guiding at least one interleaved material (B, C) between the laps (A) as both laps are being joined to introduce said interleaved material at the interleaving position into the longitudinal spaces produced between the longitudinal join lines by said mechanical action.

11. A method of claim 10 comprising the step of feeding the basic laps (A) on either side of a table (2) having longitudinal ribs, forming said bridges between the ribs (22), wherein the step of introducing at least one interleaved material comprises introduction of said interleaved material into longitudinal ducts (26) located within the ribs so that the interleaved material settles between the basic laps (A) and between the join lines (14) on leaving the ribs (22).

12. A method of claim 11 wherein the step of introducing at least one interleaved material comprises introducing a solid member (C) as said interleaved constituent.

13. A method of claim 11 wherein the step of introducing at least one interleaved material comprises injecting into the ducts (26) in the ribs (22) at least one pulverulent or fluid material which bonds to at least one of the basic laps (A) on leaving the ducts (26).

14. A method of claim 13 wherein in the step of injecting at least one pulverulent or fluid material, the said material is selected from the group consisting of thermosetting resins, thermoformable resins, plasters, cements, elastomers and foams.

15. A method of claim 10 wherein the step of introducing at least one interleaved material comprises introducing a solid member (C) as said interleaved constituent.

16. A method of claim 15 wherein the said solid member is selected from the group consisting of cables, electrical conductors, tubes, sets of filaments and threads.

17. A method of claim 10 comprising for said step of joining two basic laps, selecting a joining technique from the group consisting of needling, stitching and welding.

18. A method of claim 10 wherein the step of guiding two basic laps comprises guiding two basic laps (A) consisting of different fibers as starting materials.

19. A method of claim 10 wherein the step of introducing at least one interleaved material comprises introducing a thermoformable resin as said at least one interleaved material between the two laps (A).

20. A method of claim 10 wherein the step of guiding two basic laps comprises guiding two basic laps, one of which has a surface finish on a side facing away from the other of said two basic laps and the joining of the two basic laps is performed by an action through said other basic lap.

21. A method of claim 10 wherein the step of introducing at least one interleaved material comprises introducing fibers as said at least one interleaved material (C).

22. A method for producing a composite lap comprising:
   feeding two basic laps on either side of a table having longitudinal ribs;
   driving and guiding said two basic laps (A) in a substantially parallel relationship through a joining position and through a subsequent interleaving position;
   at the joining position, joining said two basic laps (A) to each other between the ribs thereby to form longitudinal join lines (14) while said ribs maintain, at said joining position, a predetermined distance between said laps, thereby to produce between the laps, as said join lines, rows of join bridges with each join bridge having a preset length;
   feeding at least one interleaved material into longitudinal ducts (26) located within the ribs so that the interleaved material, on leaving the ribs (22) at a downstream end thereof corresponding to the interleaving position, settles in the longitudinal spaces produced between the basic laps (A) and between the join lines (14).

23. A method of claim 22 wherein the step of introducing at least one interleaved material comprises injecting into the ducts (26) in the ribs (22) at least one pulverulent or fluid material which bonds to at least one of the basic laps (A) on leaving the ducts (26).

24. A method of claim 23 wherein in the step of injecting at least one pulverulent or fluid material, the said material is selected from the group consisting of thermosetting resins, thermoformable resins, plasters, cements, elastomers and foams.

25. A method of claim 22 wherein the step of introducing at least one interleaved material comprises introducing a solid member (C) as said interleaved constituent.

26. A method for producing a composite lap comprising:
   driving and guiding two basic laps (A) in a substantially parallel relationship through a joining position and through a subsequent interleaving position;
   joining said two basic laps (A) to each other at the joining position along longitudinal join lines (14) while maintaining, at said joining position, a predetermined distance between said laps by means of a mechanical action between the join lines which are being created to produce between the laps, as said join lines, rows of join bridges with each join bridge having a preset length;
   guiding between the laps (A), as both laps are being joined, at least one interleaved material (B,C) comprising a thermoformable resin, to introduce said interleaved material at the interleaving position into the longitudinal spaces produced between the longitudinal join lines by said mechanical action.

* * * * *